United States Patent

Petta, Jr.

[11] 3,967,615
[45] July 6, 1976

[54] COOKING APPARATUS
[75] Inventor: Victor Petta, Jr., Arlington, Tex.
[73] Assignee: The Spaghetti Importing & Warehouse Co., Dallas, Tex.
[22] Filed: Mar. 5, 1975
[21] Appl. No.: 555,426

[52] U.S. Cl. .............................. 126/369.2; 126/20.1
[51] Int. Cl.² ..................................... F24D 1/02
[58] Field of Search ............ 99/330, 355, 446, 448, 99/450; 126/369.2, 369, 20, 20.1, 20.2

[56] References Cited
UNITED STATES PATENTS

| | | | |
|---|---|---|---|
| 1,628,895 | 5/1927 | McKenna | 126/20.2 |
| 1,955,289 | 4/1934 | Greenfield | 99/330 |
| 3,063,464 | 11/1962 | Binding | 99/330 |
| 3,071,063 | 1/1963 | Churley | 99/330 |
| 3,626,840 | 12/1971 | Day | 99/450 |
| 3,733,998 | 5/1973 | Vischer, Jr. | 99/330 |
| 3,790,391 | 2/1974 | Bolleter et al. | 99/330 |

Primary Examiner—John J. Camby
Assistant Examiner—Larry I. Schwartz
Attorney, Agent, or Firm—Peter J. Murphy

[57] ABSTRACT

For finish cooking spaghetti, a steam cabinet includes a plurality of individual cooking compartments substantially closed except for an access opening in a front wall just large enough to receive a loaded cooking vessel. Steam nozzle means are disposed in the cooking compartments in a plane adjacent to the upper edge of the access opening for directing steam directly onto and through the food. In the use of this apparatus, partially precooked spaghetti is divided into serving portions, placed in cooking vessels, and inserted in cooking compartments in a selected compartment sequence. After finish cooking, which requires only a few seconds, the compartments are unloaded in the same sequence first removing the cooking vessel from the compartment and immediately transferring it to a preheated serving plate for delivery to the customer in the most palatable condition.

10 Claims, 6 Drawing Figures

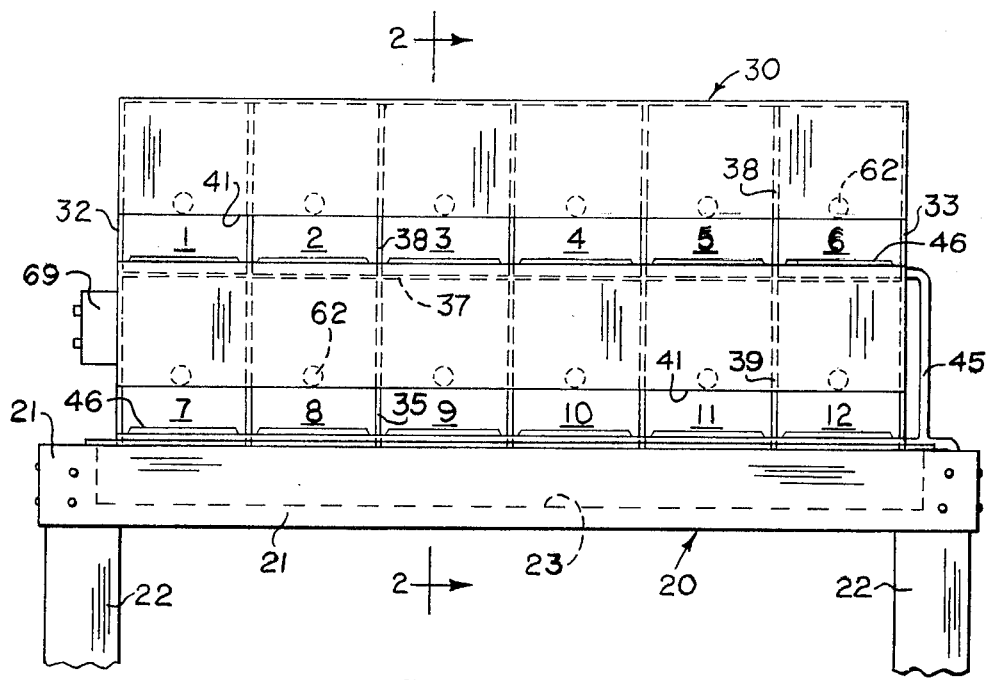

COOKING APPARATUS

BACKGROUND AND SUMMARY OF THE INVENTION

This invention relates to the cooking of food in a restaurant operation; and more particularly to the efficient producing and serving of hot food portions during peak demand periods as well as off demand periods.

This invention is particularly concerned, as described herein, with the operation of a spaghetti restaurant wherein it is particularly important, from the standpoint of customer satisfaction, that the spaghetti be served hot and cooked just right.

In larger spaghetti restaurants, it is usual procedure to precook at least several hours ahead of mealtime demand, the quantity of spaghetti that is expected to be needed for such mealtime demand period. The precooking is not complete cooking however, and the spaghetti is normally cooked to possibly 65% or 70% of completion and then chilled until needed.

At the time of need, that is the filling of orders from customers, it is usual to finish cook the spaghetti in hot water and then separate it into serving portions. A difficulty with this finish cooking technique is that as a practical matter a relatively large quantity of spaghetti is finished cooked in one cooking vessel, and this finish cooking technique cannot achieve the desideratum of removing the spaghetti from the cooking vessel at exactly the right time to prevent sogginess and delivering the serving portions to the customer under ideal conditions of temperature and consistency. With the hot water finish cooking method, if the spaghetti is left in the vessel very little too long, the spaghetti will be too soggy for maximum customer appeal. With this technique it is difficult to control the finish cooking time.

An object of this invention is to provide apparatus and method for the finish cooking of spaghetti which has been divided into serving portions (referred to as preportions) prior to the finish cooking, to enable the immediate delivery to the customer of properly cooked and hot spaghetti.

Another object of this invention is to provide apparatus and method for the finish cooking of predivided serving portions of spaghetti in a manner which will permit the finish cooker to keep up with a large demand rate of serving orders and to deliver hot spaghetti cooked to the proper consistency.

Still another object of this invention is to provide method and apparatus to enable the finish cooker to adjust the rate of finish cooking in accordance with the demand.

These objects are accomplished in apparatus which includes a steam cabinet having a plurality of individual cooking compartments opening to its front wall. Each compartment is closed except for an access opening in the front wall just sufficiently large to pass a loaded cooking vessel. A removable floor member is supported in each compartment providing a discontinuous support surface elevated from the compartment bottom wall. Each compartment access opening is dimensioned to readily pass a cooking vessel with an associated food portion and the floor member support surface is disposed generally in the plane of the lower edge of the access opening. A steam dispensing nozzle means is disposed in each compartment generally in a plane adjacent the upper edge of the access opening for directing steam toward the cooking vessel. A plurality of cooking vessels for use with the apparatus each comprise a body having a planar bottom wall with a laterally projecting handle, the vessel body being dimensioned to pass readily into and out of the access openings with a food portion therein, and the bottom wall having perforations to permit passage of steam and moisture downwardly through the vessel and its contents.

The method directly involving the use of the apparatus of the invention includes the transferring of preportions of food, which are precooked and divided into serving portions, into individual cooking vessels and, after directing a supply of steam to the cabinet, inserting the loaded cooking vessels into cabinet compartments in a selected compartment sequence whereby the food is directly exposed to steam from the nozzle means. After this loading cycle for several compartments is completed, the food in the first compartment will have been finish cooked. The unloading cycle then follows with the same sequence of compartments, and includes the following steps for each compartment:

1. removing the cooking vessel from the compartment and,
2. immediately transferring the food portion to a preheated serving plate, for delivery to the customer after receiving desired sauce and/or other food articles.

In more detail, the steps preparatory to the finish cooking include precooking the spaghetti in large quantities to about 65% to 70% of completion; dividing the spaghetti into the preportions; and chilling the spaghetti to remove all precooking heat.

The novel features and the advantages of the invention, as well as additional objects thereof, will be understood more fully from the following description when read in connection with the accompanying drawings.

DRAWINGS

FIG. 1 is a front elevation view of cooking apparatus according to the invention;

FIG. 3 is a fragmentary front elevation view, partially broken away and partially in section, of the apparatus of FIG. 1;

FIG. 6 is a top view of a cooking skillet.

DESCRIPTION OF THE PREFERRED EMBODIMENT

Figure 4:
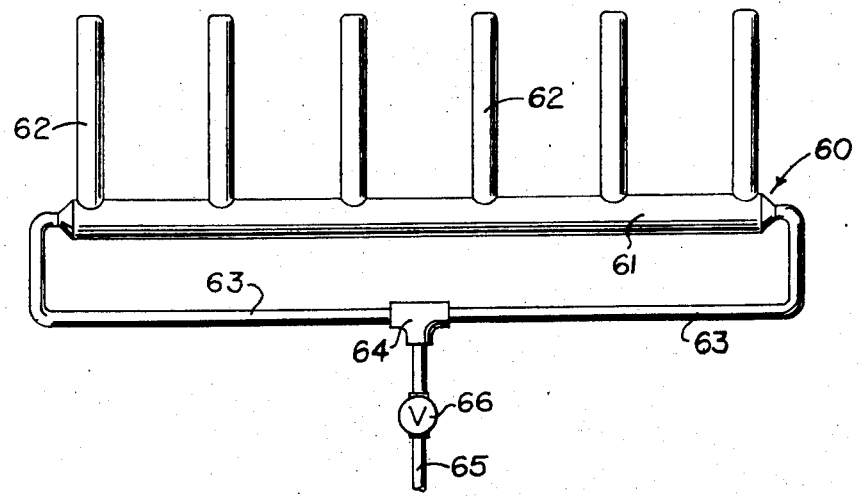
FIG. 4 is a diagrammatic illustration of the steam dispensing system.

As illustrated in the drawings, a preferred form of apparatus according to the invention includes an assembly of a support table 20 and a steam cabinet 30. The table is, for example, fabricated from stainless steel, and includes a table top 21 fabricated from sheet steel supported on suitable legs 22 fabricated from angles which are suitably riveted or otherwise secured to the table top. A drainage sink 23 is formed in the table top along the front position thereof; and this sink is covered by a support grid 24 to support cooking vessels to be drained.

The steam cabinet 30 is preferably fabricated from stainless steel sheet, and is parallelopiped in shape including walls and partitions suitably joined as by welding or soldering. The principal walls include a bottom wall 31, end walls 32 and 33, a top wall 34, a front wall 35 and a vertical partition 36 which divides the cabinet into front and rear portions with the back wall of the cabinet being open. The front portion of the cabinet is divided into upper and lower portions by a horizontal partition 37 connecting the front wall and vertical partition and the two side walls. The upper portion is divided into six side-by-side compartments by vertical partitions 38, and the lower portion is divided similarly into six side-by-side compartments by vertical partitions 39, and with these partitions 38 and 39 being suitably joined to the respective walls and partitions to define substantially closed individual compartments. These compartments include an upper bank of six compartments designated by the numbers 1 through 6 appearing on the front wall in FIG. 1, and a lower bank of compartments designated by the numbers 7 through 12. The front wall 35 is discontinuous to provide elongated access openings 41 which are spaced slightly from the respective compartment bottom walls being relatively narrow in height and extending the full width of each compartment.

By way of example, the dimensions of each compartment may be as follows: height 8 inches, width 7 inches, depth 9 inches, with the access opening having a height of about 2½ inches with its lower lip being spaced about ½ inch from the compartment bottom wall. A steam cabinet of these dimensions is designed for use with cooking vessels in the form of a shallow 6 inch skillet with the access opening being dimensioned to accommodate such skillet with a food serving portion of about 8 ounces of spaghetti.

The cabinet is provided with means for draining condensate from the several compartments; and for this purpose the upper bank of compartments 1 through 6 may be interconnected by means of small drainage ports through the partitions 38 adjacent to the partition 37 to permit lateral flow of liquid to the compartment 6. Similarly, for the lower bank of compartments, the partitions 39 may have drainage ports adjacent to the bottom wall 31 for effecting flow of liquid to the compartment 12. Compartments 6 and 12 then are drained by means of a suitable drainage pipe 45 which may also be connected to the drainage sink 23 as best seen in FIGS. 1 and 3.

A removable floor member 46 is provided in each compartment, for supporting a cooking vessel in spaced relation to the compartment bottom wall to effect the above mentioned drainage of condensate. As illustrated, these floor members may have the form of a rectangular shallow flat pan, preferably fabricated from perforated stainless steel and which is inverted to define a support surface elevated about ¾ inch from the bottom wall and in a plane slightly above the lower lip of the access opening 41. This floor member may have any convenient configuration to effect drainage of condensate and is removable for convenience of cleaning the apparatus.

A preferred form of cooking vessel 50 is a shallow 6 inch skillet having an elongated generally horizontally projecting handle 51, and with the bottom wall provided with perforations 52 to effect passage of steam through the food portion contained therein and to effect drainage of any condensate from the skillet. As mentioned, this size of skillet is adapted to hold a food serving portion of about 8 ounces of spaghetti.

Figure 2:
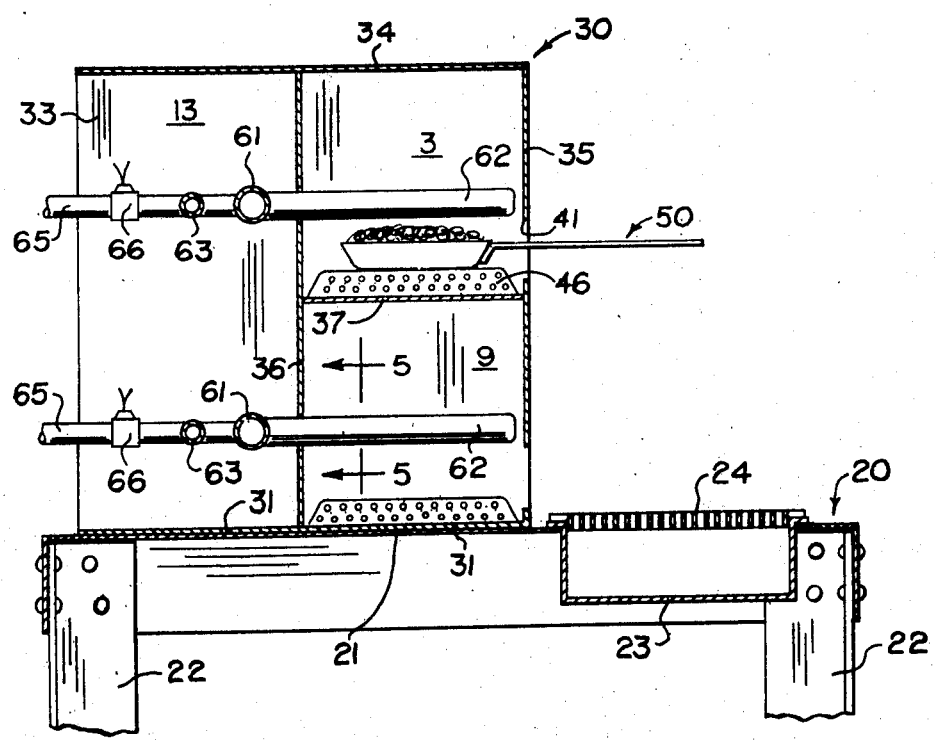
FIG. 2 is a sectional view taken in the plane 2—2 of FIG. 1.

The steam distribution system for the cabinet 30 includes separate systems for the upper and lower banks of compartments as seen in FIG. 2; and FIG. 4 is a diagrammatic illustration of the system for each bank of compartments. Referring to FIG. 4 each system 60 includes an elongated manifold 61, six equally spaced parallel nozzle pipes 62 extending transversely from the manifold in a common plane, conduits 63 extending from a tee 64 for directing steam to both ends of the manifold 61, and a conduit 65 supplying steam to the tee 64 and including an electrically operated control valve 66. The control valve 66 is preferably a solenoid operated on-off valve since, when the cabinet is in operation, steam will be supplied continuously to at least one bank of compartments. The conduits 65 are connected to a suitable steam generator or other source of steam which sill supply steam at a pressure of 10 to 12 psi, for example. A switch housing 69 may be mounted on one side of the cabinet, including two switches for selectively operating the respective valves 66 to select the operation of either one or both banks of compartments.

Figure 5:
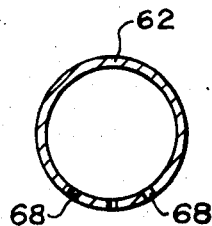
FIG. 5 is a sectional view of a steam nozzle taken in the plane 5—5 of FIG. 4.

As seen in the drawings, the nozzle pipes 62 are disposed centrally in their respective compartments generally in a plane slightly above the upper edges of the respective access openings 41, with the nozzle pipes extending substantially the full depth of the compartments. As best seen in FIG. 5, the nozzle pipes are provided with the rows of downwardly directed jet orifices, with each nozzle for example including three rows of 25 drilled holes of about 1/16 inch diameter. As best seen in FIG. 3 the distribution systems, except for the nozzle pipes 62 are supported within the open rear compartment 13 defined by the rear portion of the cabinet. The nozzles 62 then are in close proximity to the vessel and contained food for maximum penetration of steam through the food.

Operation

The use of the above described apparatus, and its method of operation, will now be described with reference to operation by a single finish cooking chef who will be referred to as the operator. It is assumed that a supply of serving plates will be available; and the steam cabinet may be designed to support a supply of serving plates on the top wall 34, and the steam cabinet may then be employed to preheat the plates and maintain a heated storage area for use. For preheating the plates and steam cabinet it would only be necessary to supply steam to the upper bank of compartments for example. Prior to use for finish cooking, the steam valves will be opened to supply steam to all compartments.

It will also be assumed that a supply of precooked, divided and chilled serving portions of spaghetti, hereafter referred to as "pre-portions" are available to the operator in his work area. These pre-portions will have been precooked to about 65% or 70% of completion for example, then divided into appropriately sized serving portions in suitable containers or on trays for example, and then chilled to remove all of the precooking heat. The chilling may be accomplished by refrigeration at about 40° F for about three hours. The finish cooking of such pre-portions, in the described steam cabinet, will require a minimum time of from 6 to 8 seconds for example depending on the temperature of the pre-portions prior to finish cooking. It should be understood also that these pre-portions may remain in the finish cooker for a much longer period of time, in excess of five minutes for example, without effecting any undesirable change in the finished product.

For loading the steam cabinet, the operator will operate the 12 compartments in a selected sequence, in what may be referred to as a load cycle, with the load cycle for each compartment including the following steps: (a) transfer a pre-portion to a cooking vessel, (b) placing the cooking vessel in a cooking compartment. The loading of the twelve compartments will require at least 7 to 8 seconds, so that when the twelve compartments are loaded, the food portion in the first compartment will have been finish cooked and ready for serving.

The operator will then remove the finish cooked food from the compartments in the same compartment sequence, following what may be referred to as a "serve cycle" for each compartment. The food will only be removed in response to the orders of the waiters or waitresses then waiting to carry the food to the customer. Assuming an order for four plates, the operator will remove the cooking vessel from compartment 1 and immediately transfer the food portion to a warm serving plate. The plate will then be handled by another person who will place the desired sauce or other food article on the serving plate which is then ready for delivery to the waiter or waitress. This procedure will be followed for compartments 2, 3 and 4.

The operator will then proceed to fill orders from the remaining 8 compartments in sequence; the object being to deliver the spaghetti serving to the customer as quickly as possible after it is removed from the finish cooking compartment. When the twelve compartments are unloaded, the operator will then repeat the load cycle, and at the completion of the load cycle will again be ready to fill orders.

When the load demand lessens, the operator may operate any lesser number of compartments as desired; and when the number of operated compartments can be reduced to six or less, the operator can of course shut off the steam to the lower bank and operate only compartments 1 through 6 for example. In times of very low demand, the pre-portions would not be placed in the steam cabinet until the order is placed; and yet the order can be filled within a matter of a few seconds as the precooking cycle only requires about 7 to 8 seconds. In times of lower demand, the finish cooking operator may himself also perform the function of placing the desired sauce on the serving, or alternatively the serving personnel may do this. Again, regardless of the demand at a particular time, the object of the apparatus and method is to deliver the food to the customer as soon as possible after removal from the finish cooking cabinet, and this can be readily accomplished with the described apparatus.

What has been described is a unique apparatus and method of use which is particularly adapted for the finish cooking of spaghetti in a spaghetti restaurant operation to provide for efficient finish cooking and serving of spaghetti for the purpose of delivering the servings to the customers in a most palatable condition.

The apparatus and method of use are uniquely designed to provide for most efficient use of facilities and personnel; and the apparatus and method are very flexible to accommodate demand conditions from peak demand to lesser demand. For lessening demand, the operator may decrease the number of compartments used as desired; and in the event that only half of the compartments are required, the steam to the lower bank of compartments for example may be shut off.

A particular advantage of this finish cooking system is that the spaghetti is finish cooked in response to the demand therefore eliminating waste, and yet the orders are filled promptly and delivered promptly for maximum customer satisfaction.

While a preferred embodiment of the invention has been illustrated and described, it is understood by those skilled in the art that modifications may be resorted to without departing from the spirit and scope of the invention.

What is claimed is:

1. Finish cooking apparatus comprising
a steam cabinet including a plurality of individual cooking compartments opening to a front wall thereof; said steam cabinet having walls and partitions defining said plurality of cooking compartments of uniform size, each being substantially closed except for a continuously open access opening in said front wall; said access opening being just sufficiently large to pass a loaded cooking vessel;
a removable floor member supported in each compartment, providing a discontinuous support surface spaced from the compartment bottom wall and disposed in a plane adjacent to the lower edge of the access opening;
steam dispensing nozzle means disposed in each compartment generally within in a plane adjacent to the upper edge of its access opening, each nozzle means including downwardly directed steam jet apertures for directing steam toward a cooking vessel disposed on said support surface;
and a plurality of cooking vessels of uniform size each comprising a body having sidewalls and a planar bottom wall, and a laterally projecting handle; said vessel body being dimensioned to pass readily into and out of said access openings with a food portion therein; and said body bottom wall having perforations for coaction with the compartment discontinuous floor member, to permit passage of steam and moisture through the cooking vessel and its contents;
means for draining liquid from the bottom wall of each compartment.

2. Apparatus as set forth in claim 1
a steam dispensing system for a group of compartments comprising: respective steam dispensing nozzle means for the compartments of said group, a common manifold for said respective nozzles, a brushed supply conduit connected to opposite ends of said manifold, and shut off valve means for controlling steam flow to said supply conduit;
said common manifold being disposed exteriorly of said respective compartments;
said branched conduit being arranged to supply steam simultaneously to both ends of said common manifold; and said valve means being effective to selectively supply steam to said group of compartments, as a group.

3. Apparatus as set forth in claim 1
said cooking vessel comprising a relatively shallow pan with its sidewalls terminating in an upper plane parallel with the perforated planar bottom wall; said vessel body being of predetermined width and depth with said handle projecting laterally from the rearward sidewall thereof;
said cooking compartments being parallelopiped in configuration and of uniform size having a width and depth just sufficient to accommodate the body of said cooking vessel, having a height sufficient to accommodate said removable floor member, the height of said cooking vessel, and said nozzle means; and said access opening comprising a laterally extending rectangular port having a height and width just sufficient to accommodate the body of said cooking vessel, with said cooking vessel handle extending out of said port for ready grasping to remove said vessel from the compartment.

4. Apparatus as set forth in claim 3 said compartments being arranged in a plurality of groups; an individual steam dispensing system for each group; each steam dispensing system comprising said nozzle means connected to a common manifold, said valve means and said associated conduit means.

5. Apparatus as set forth in claim 3 said steam dispensing nozzle means comprising elongated tubular nozzles extending substantially from front to rear of the compartment centrally thereof, and having a plurality of downwardly directed steam jet apertures.

6. Apparatus as set forth in claim 3 said steam cabinet, walls and partitions defining at least two superposed banks of a plurality of side-by-side cooking compartments; each steam dispensing system for each bank of compartments including electrically operated valve means for controlling the supply of steam; and control switch means, mounted adjacent to the cabinet front wall, for selectively operating the respective valve means.

7. Apparatus as set forth in claim 1 said steam dispensing nozzle means comprising elongated tubular nozzles extending substantially from front to rear of the compartment centrally thereof, and having a plurality of downwardly directed steam jet apertures; said stream jet apertures being disposed in the planes of the respective access opening upper edges.

8. Apparatus as set forth in claim 7 wherein said steam jet apertures are arranged in three longitudinal rows and have a diameter of about 1/16 inch.

9. Apparatus as set forth in claim 1 each compartment having a width of about 7 inches, a depth of about 9 inches, and a height of about 8 inches, and an access opening having a width of about 7 inches and a height of about 3 inches and being spaced from the compartment bottom wall; and said cooking vessels comprising 6 inch shallow skillets.

10. Apparatus as set forth in claim 1 means defining a horizontal work surface including a grid covered draining sink; and means supporting said steam cabinet adjacent to said work surface, with its front wall accessible to said work surface.

* * * * *